(No Model.)

D. FREEL.
SCOOP DITCHING SHOVEL.

No. 440,260. Patented Nov. 11, 1890.

Witnesses
Thos. F. Houghton
M. E. Cowell

Inventor
Dennis Freel
By Henry B. Munn
his Attorney

UNITED STATES PATENT OFFICE.

DENNIS FREEL, OF CHARITON, IOWA.

SCOOP DITCHING-SHOVEL.

SPECIFICATION forming part of Letters Patent No. 440,260, dated November 11, 1890.

Application filed July 29, 1890. Serial No. 360,311. (No model.)

*To all whom it may concern:*

Be it known that I, DENNIS FREEL, a citizen of the United States, residing at Chariton, in the county of Lucas and State of Iowa, have invented certain new and useful Improvements in Scoop Ditching-Shovels; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
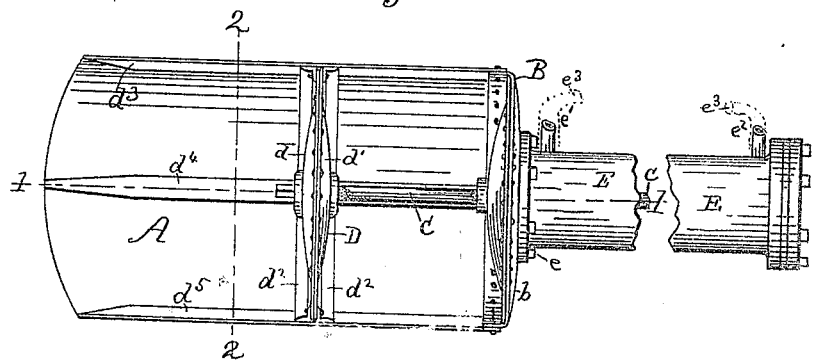
Figure 2:
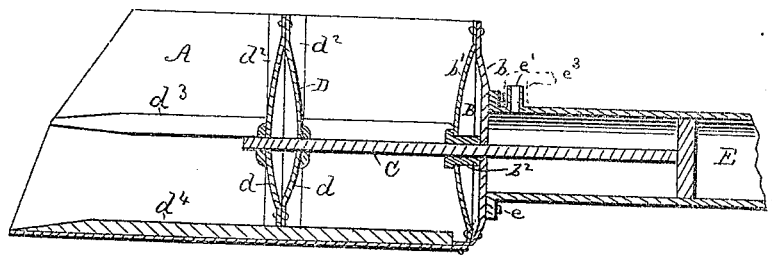
Figure 3:
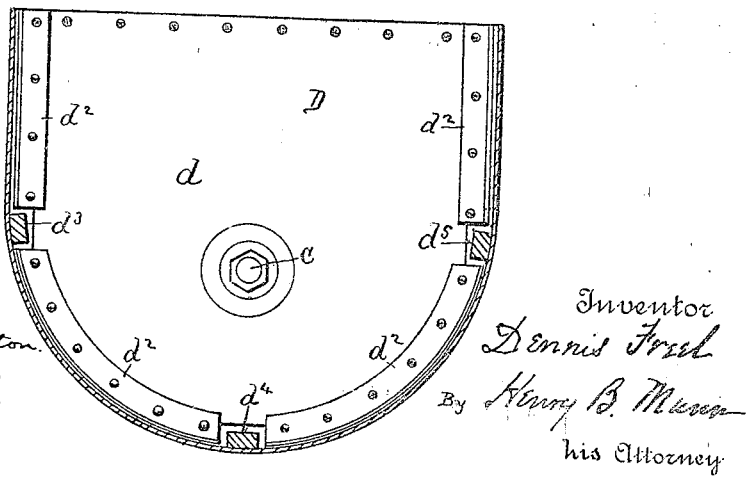

Figure 1 represents a plan view of the device; Fig. 2, a longitudinal section on line 1 1 of Fig. 1. Fig. 3 is a section on line 2 2 of Fig. 1.

The present device is an improvement on my patent, No. 270,776, dated January 16, 1883. In said patent the ditching-shovels are tilted at their rear ends to discharge their contents. In the present improvement I use on each shovel a compressed-air cylinder containing a piston-rod and piston. The piston-rod has attached to its front end a pusher-plate, as will be hereinafter more fully described, and particularly pointed out in the claims.

A designates one of a series of shovels of semi-cylindrical form and pointed in front, as shown in Figs. 1 and 2.

For a good operative shovel I find that the following dimensions are good: Length on bottom, four and a half feet; length on top, three and a half feet; thirty inches wide on top and twenty-seven inches deep. One-fourth inch boiler-iron is sufficiently strong for this purpose.

B is the closed end of the shovel, consisting of two convex plates $b$ $b'$, riveted firmly together. The outer one $b$ is flanged all around, except at the top of the shovel. The inner plate $b'$ is riveted to plate $b$, all around near the edges of said plates $b$ $b'$. In a vertical central line and at about two-fifths of its height this double end B of the shovel is perforated for piston-rod C and provided with a stuffing-box $b^2$.

D is a pusher plate or piston constructed of two convex plates $d$ $d'$, cut to the contour of the interior of the shovel, so as to slide easily therein.

$d^2$ designates two-inch angle-iron border.

$d^3$ $d^4$ $d^5$ are three longitudinal guide-strips to keep pusher-plate or outside piston in place. Pusher-plate D is securely attached to the outer end of piston-rod C of compressed-air cylinder E. Air-cylinder E is rigidly attached by bolts $e$ to the end of shovel A.

$e'$ $e^2$ are inlet and outlet ports, each port acting alternately as inlet and outlet port in the usual well-known manner. Said ports $e'$ $e^2$ are connected by flexible tubing $e^3$ to the motor.

It will be easily understood that when the shovel or series of shovels are to be unloaded the engineer opens the throttle-valve, which operates the piston and the pusher-plate in the usual well-known manner.

By this improvement I have very much increased the amount of work performed by my invention hereinbefore mentioned.

What I claim as new, and desire to secure by Letters Patent, is—

1. A ditching or grading shovel provided with a pushing-plate or outside piston attached to the piston-rod of a compressed-air cylinder, as and for the purpose herein set forth.

2. The combination and arrangement of shovel A, pusher D, air-cylinder E, and piston-rod C, as set forth.

3. In a ditching-shovel, the combination of a compressed-air cylinder, a piston-rod with two pistons attached thereto, the inner piston within the cylinder, the outer piston in the shovel, as and for the purposes herein set forth.

In testimony whereof I affix my signature in presence of two witnesses.

DENNIS FREEL.

Witnesses:
FRANK Q. STUART,
O. A. BARTHOLOMEW.